United States Patent [19]
Kubis et al.

[11] Patent Number: 5,265,563
[45] Date of Patent: Nov. 30, 1993

[54] CYLINDER HEAD SEALING ARRANGEMENT FOR RECIPROCATING PISTON ENGINES

[75] Inventors: Heribert Kubis, Nürnberg; Josef Winter, Rednitzhembach, both of Fed. Rep. of Germany

[73] Assignee: MAN Nutzfahrzeuge Aktiengesellschaft, Munich, Fed. Rep. of Germany

[21] Appl. No.: 989,075

[22] Filed: Dec. 11, 1992

[30] Foreign Application Priority Data

Dec. 19, 1991 [DE] Fed. Rep. of Germany ....... 4142031

[51] Int. Cl.$^5$ .............................................. F02F 1/10
[52] U.S. Cl. .............................. 123/41.83; 123/193.3
[58] Field of Search .............. 123/41.84, 193.3, 41.72, 123/41.83

[56] References Cited
U.S. PATENT DOCUMENTS

| | | | |
|---|---|---|---|
| 4,867,118 | 9/1989 | Kubis et al. | 123/41.84 |
| 5,010,853 | 4/1991 | Kubis et al. | 123/41.84 |

*Primary Examiner*—Noah P. Kamen
*Attorney, Agent, or Firm*—Robert W. Becker & Associates

[57] ABSTRACT

A cylinder head sealing arrangement for reciprocating piston engines, especially internal combustion engines. An end of each cylinder liner that faces a cylinder head is provided with a raised collar that includes a centering portion. A preferably metallic combustion chamber seal in the form of a ring having a constant thickness in a starting position is guided with clearance fit. When cylinder head screws are tightened, the ring undergoes a plastic deformation of at least one end face. The ring has an inner surface that is guided relative to the centering portion only via a cylindrical guide region of the ring or the raised collar. The free space between the ring and the centering portion increases continuously proceeding from the guide region so that after plastic deformation the ring rests flat upon the cylinder liner beyond the region of a radius that defines a transition between the liner and the collar.

6 Claims, 2 Drawing Sheets

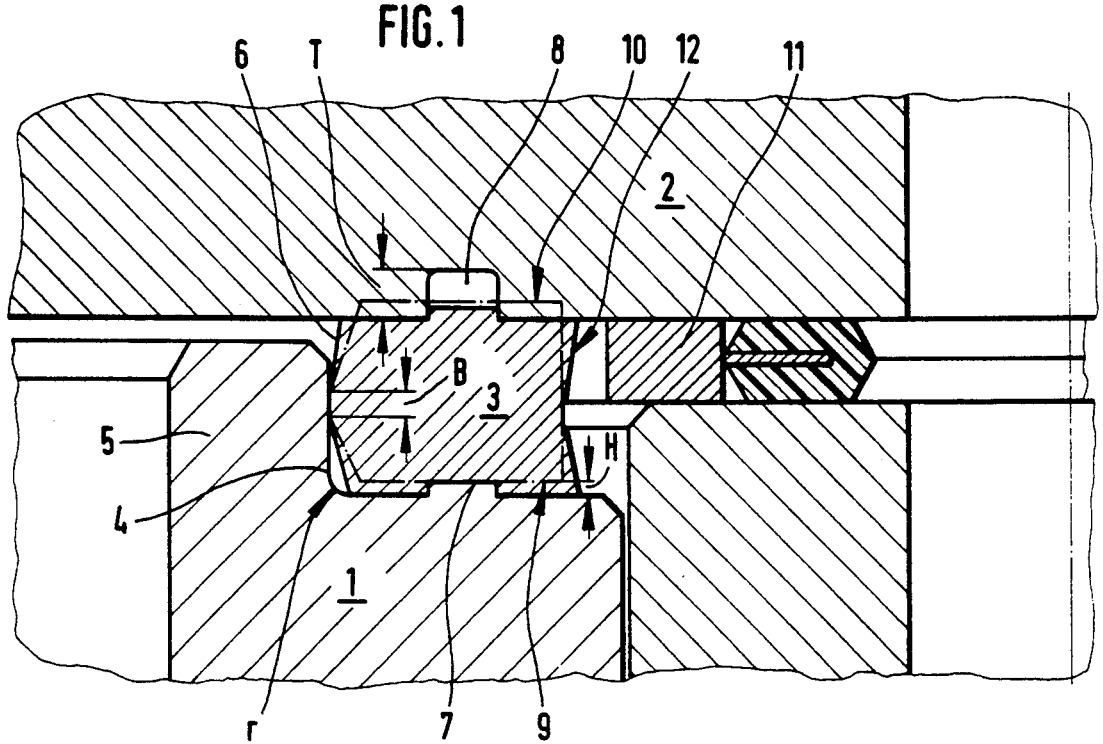
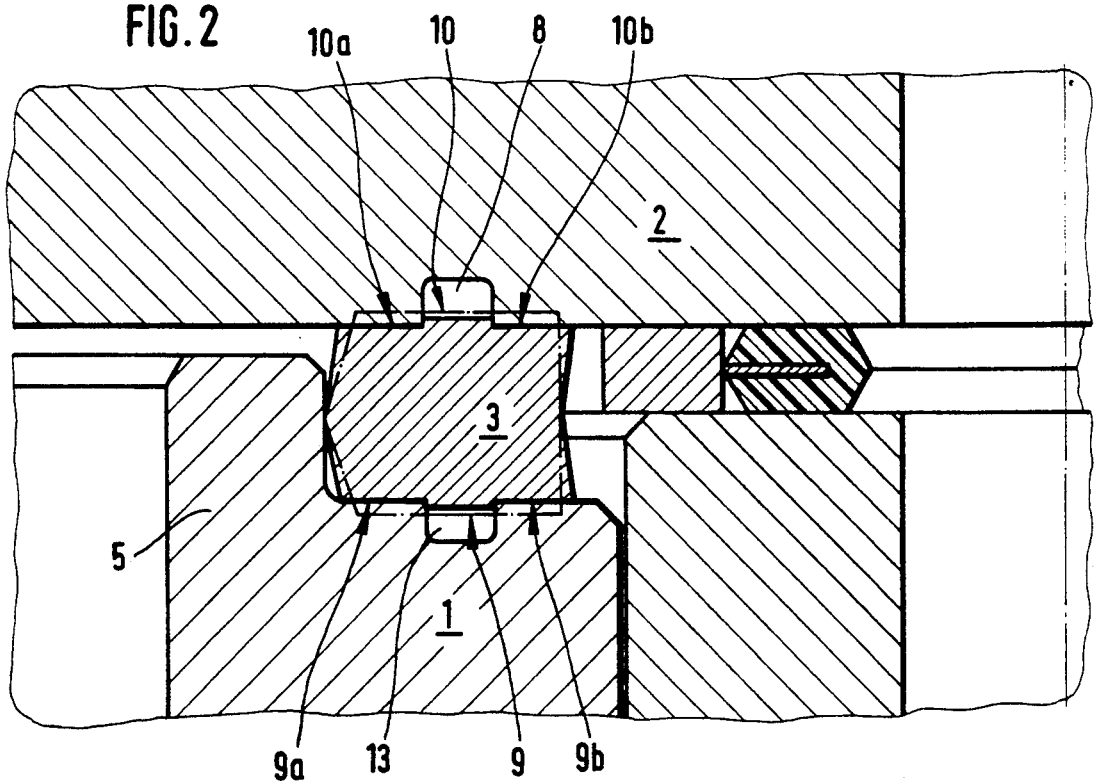

CYLINDER HEAD SEALING ARRANGEMENT FOR RECIPROCATING PISTON ENGINES

BACKGROUND OF THE INVENTION

The present invention relates to a cylinder head sealing arrangement for reciprocating piston engines, especially internal combustion engines, and advantageously engines having cylinder liners. The end of each liner that faces a cylinder head is provided with a raised collar that includes centering means. A preferably metallic combustion chamber seal in the form of a ring having a constant thickness in a starting position is guided with clearance fit. When the cylinder head screws are tightened, this ring undergoes a plastic deformation of a first and/or second end face. A seal for the remainder of the surface is provided for delimiting the plastic deformation.

Sealing the cylinder heads of supercharged internal combustion engines, with the thereby resulting high pressure forces upon the cylinder heads, is increasingly problematic. To resolve this problem, it has been proposed to deform the cylinder head seal plastically beyond the flow or Yield limit of the material. In this region, the loading force (sealing force) that is transmitted from the cylinder head screws to the cylinder head seal is largely independent of variations in dimension and is prescribed solely by the strength of the material. In this way, the fraction of the screw force that is introduced into the cylinder head seal is clearly defined. Unfortunately, offsetting these advantages are problems with respect to centering of the sealing ring, since on the one hand a small tolerance of the radial play leads to obstruction of the plastic deformation process and when the play is exhausted a so-called hydrostatic state of stress occurs, and on the other hand if the radial play is too great this leads, due to displacement or shifting of the ring, to a stressing of the ring that is no longer radially symmetrical and hence leads to an undesired variation of the sealing force upon the end faces of the seal (U.S. Pat. No. 5,010,853, Heribert Kubis et al).

It is an object of the present invention to improve a cylinder head sealing arrangement of the aforementioned general type in such a way that the centering is ensured without destroying the plastic deformation.

BRIEF DESCRIPTION OF THE DRAWINGS

This object, and other objects and advantages of the present invention, will appear more clearly from the following specification in conjunction with the accompanying schematic drawings, in which:

FIG. 1 shows a ring with centering being provided in the region B and free space being provided for the plastic deformation both below and above the region B;

FIG. 2 shows a ring with a respective groove in both a cylinder liner and in the cylinder head:

SUMMARY OF THE INVENTION

The cylinder head sealing arrangement of the present invention is characterized primarily in that the ring has an inwardly directed surface that is guided relative to the centering means only via a cylindrical guide region of one of the ring and the raised collar; and in that a free space is provided between the ring and the centering means and increases continuously proceeding from the cylindrical guide region so that after plastic deformation the ring rests flat upon the cylinder liner beyond the region of a radius that defines a transition between the cylinder liner and the raised collar.

Due to the fact that the guide region, which is disposed half way up the ring, undergoes no appreciable deformation and has only the slight height B the radial play can be kept very small. Thereby making centering more precise. After the small play has been exhausted during the course of deformation, the ring comes to rest against the centering means only in the region B, yet due to the fact that the radial play increases continuously proceeding from the region B, the flow or yield process that is effected from the end faces of the ring is not obstructed.

Several advantageous embodiments of the increasing free space that proceeds from the guide region B and is disposed between the ring and the centering means are proposed in the instant application. However since in all cases the guide region B is kept very narrow and the free space inventively increases proceeding from the region B, centering is improved without thereby obstructing the flow deformation. At the same time, the amount of machining that is required is reduced since a precise diameter tolerance is required only in the region B.

Further specific features of the present invention will be described in detail subsequently.

DESCRIPTION OF PREFERRED EMBODIMENTS

Figure 3:
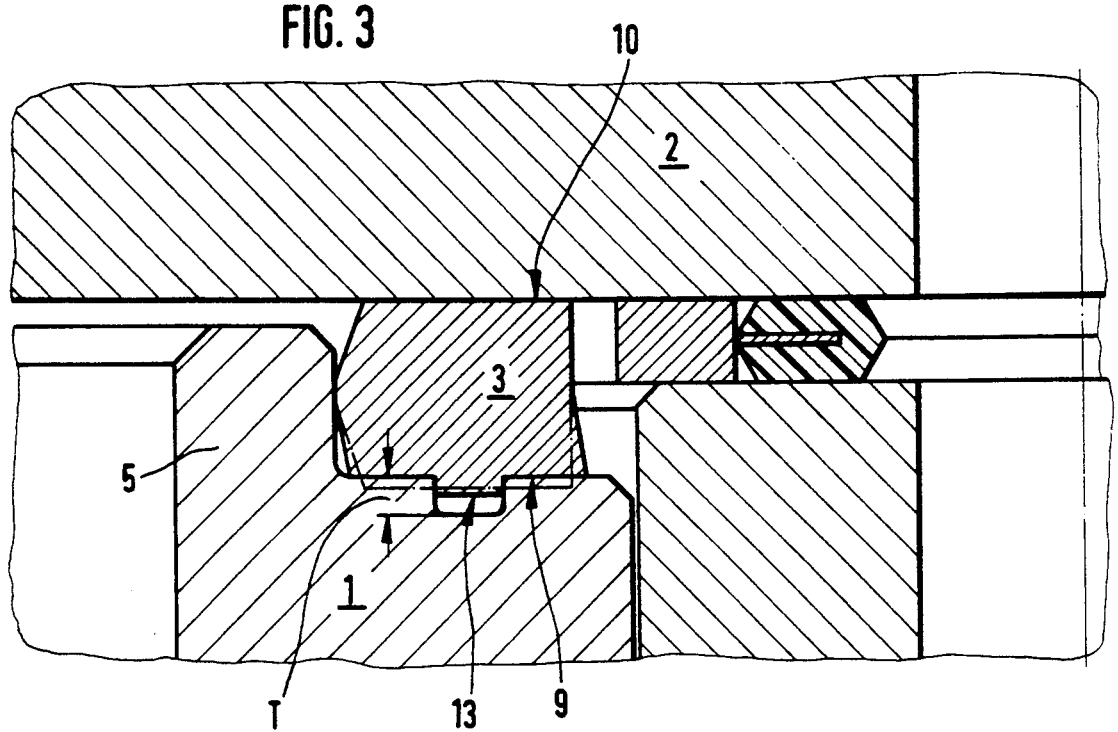
FIG. 3 shows a ring and an annular groove in the cylinder liner.

Referring now to the drawings in detail, to effect a seal between the cylinder barrel or liner 1 and the cylinder head 2, a ring 3 is provided as a combustion chamber seal. The ring 3 is centered relative to a centering means 4 of a raised collar 5 of the cylinder liner 1. Pursuant to the present invention, the ring 3 is centered only in a cylindrical region B and not over the entire width of its inner surface 6. Proceeding from the region B, the free space or clearance between the centering means 4 and the inner surface 6 continuously increases (FIGS. 1, 2 and 3). The inner surface 6 can have a conical configuration in this region. In conformity with the magnitude of the transition radius "r" between the raised collar 5 and the end face of the cylinder liner 1, the conical angle or angle of taper is such that the ring 3 is seated flat, even after yield or flow deformation has taken place, and does not extend into the region of the radius "r". In this way, not only is a free deformability of the ring 3 ensured, but a slight variation of the force that is transmitted from the ring 3 to the liner 1 is also ensured since an additional, undesired secondary deformation that occurs in the region of the radius at high tolerances is avoided.

In order to be able to plastically deform the ring 3, the upper rim of the cylinder liner 1 has an annular rib or land 7, and the cylinder head 2 has a similarly annular groove 8 that is disposed concentrically opposite the rib 7. When the nonillustrated cylinder head screws are tightened, the rib 7 penetrates a first end face 9 of the ring 3, with the starting position of the end face 9 being illustrated by a dot-dash line. A second end face 10 of the ring 3, which is also shown in the starting position by a dot-dash line, penetrates the groove 8 under the force of the cylinder head screws and partially fills this groove. The yield or flow process is terminated as soon as the sealing surface of the cylinder head 2 comes to rest completely upon the seal 11 for the remainder of the surface, with the thickness of the seal 11 being precisely set. The configuration of the deformed ring 3 is indicated by the solid lines. As shown in the drawings, the ring 3 is deformed outwardly and inwardly in the vicinity of its end faces 9 and 10. So that the flow process upon the inner surface 6 is not obstructed by the centering collar 4 of the liner 1, the inner surface 6 has a conical shape in the embodiments of FIGS. 1, 2 and 3. In this way, those zones of the ring 3 that are subject to deformation can expand freely, whereas in the region B the ring 3 is satisfactorily centered without thereby obstructing the deformation.

Since the region B is in a zone that is not affected by the deformation, the radial play between the ring 3 and the centering means 4 can be kept very small, as a result of which centering is much better than is the case with a ring having an exclusively cylindrical inner surface since in such a case the radial play must be greater in order not to obstruct the plastic deformation.

An additional advantage of the inventively improved centering is that the deformation of the ring 3 takes place in an entirely symmetrical manner, thus ensuring the sealing function and a uniform introduction of force.

In order to ensure the desired yield or flow characteristic as well as a reproducible state of stress in the plastically deformed zones of the ring 3, surface ratios were selected on the basis of tests with steel yield rings such that the ratio of the first end face 9 (FIG. 1) of the ring 3, with a value A1, to the second end face 10, which is reduced by the annular surface of the groove 8 and has the value A2, is $A1/A2 = 3/2$; furthermore, the ratio of an annular surface of the rib 7, with the value A3, to the reduced second end face 10 is $A3/A2 = 1/2$. The annular surfaces of the end face 9 that remain on both sides of the rib 7 after the plastic deformation have approximately the same width. Similarly, the annular surfaces of the end face 10 that remain beyond the groove 8 after the deformation have approximately the same widths. The height H of the rib 7 is such that due to the relative compression in this region, taking into consideration the properties of the material of the ring 3, a plastic state is established, i.e. that the yield limit is reliably achieved. After the first end face 9 of the ring 3 rests completely upon the cylinder liner 1, the yield deformation continues on the side of the cylinder head 2 since due to the presence of the groove 8 the second end face 10 is reduced to the remaining portions of the second end face such that yield deformation having the desired characteristic is ensured.

The aforementioned ratios $A1/A2 = 3/2$ and $A3/A2 = 1/2$ are, with a certain variation, valid for steel with a characteristic plastic flow. If different materials are used, then in conformity with the teaching of the present invention different surface ratios might be appropriate.

FIG. 2 illustrates an alternative approach. Prior to deformation, the ring 3 has the same shape as in FIG. 1. However, in this embodiment an annular groove 13 is provided in place of the rib or land 7, with the groove 0 that was described in conjunction with the embodiment of FIG. 1 remaining in the cylinder head. With respect to the surface ratios, not only the ratio of the surface 10 to the sum of the surface portions 10a and 10b, but also the ratio of the surface 9 to the sum of the surface portions 9a and 9b, range from 1:1 to 3:2, as a result of which the desired yield deformation is achieved even when using high-strength materials (steel) which, as previously, nonetheless have a high plastic flow that permits deformation in the horizontal region of the stress-plastic flow characteristic curve. The circumferential grooves furthermore ensure a radial form locking. All of the surface portions 9a, 9b, 10a and 10b of the end faces 9 and 10 that remain on both sides of the grooves 8 and 13 after the plastic deformation have approximately the same width.

FIG. 3 illustrates a further exemplary embodiment, where only the cylinder liner 1 has an annular groove 13. The ring 3 has the same configuration as in the embodiments of FIGS. 1 and 2. The surface of the second end face 10 has a ratio of approximately 3:2 to the remainder of the surface of the first end face 9 that is not affected by the deformation. Similar to the depths T of the groove 8 in FIGS. 1 and 2, the depth T of the recess 13 is such that at the base of the groove 13 a clearance remains in order to avoid the aforementioned hydrostatic state of stress.

Figure 4:
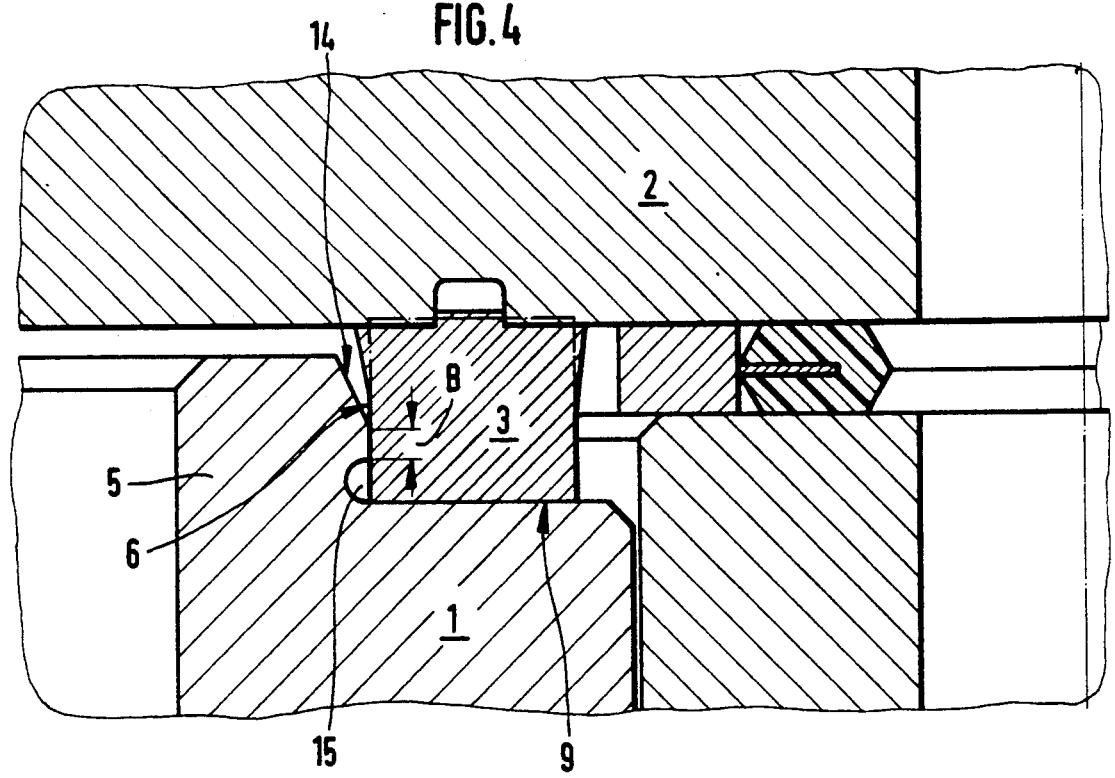
FIG. 4 shows a ring with the guide region B in the cylinder liner.

FIG. 4 shows a further variation where the region B for centering the ring 3 is associate with the cylinder liner 1. The inner surface 6 of the ring 3 is cylindrical. The free space or clearance that proceeds from the region B is achieved on the one hand in that the raised collar 5 of the cylinder liner 1 has a preferably tapered bevel or chamfer 14. On the other hand, the free space is realized by a relief area 15. Also with this embodiment, the advantage of which is a more economical sealing ring, an unobstructed deformation of the inner surface 6 of the ring 3 is permitted.

With all of the embodiments of FIGS. 1 to 4, it should be noted that prior to the plastic deformation the height of the ring 3, which is independent of the seal 11 for the remainder of the surface (FIG. 1), can be such that at the sealing surface between the ring 3 and the cylinder head 2 the ring can elastically follow relief from inner deformations of the cylinder head base, for example during stressing due to ignition pressure.

The present invention is, of course, in no way restricted to the specific disclosure of the specification and drawings, but also encompasses any modifications within the scope of the appended claims.

What we claim is:

1. In a cylinder head sealing arrangement for reciprocating piston engines, especially internal combustion engines, and advantageously engines having cylinder liners, whereby an end of each cylinder liner that faces a cylinder head is provided with a raised collar that includes centering means, and including combustion chamber seal in the form of a ring having a constant thickness in a starting position, whereby when cylinder head screws are tightened said ring undergoes a plastic deformation of at least one of a first and second end face thereof, and also including a seal for delimiting said plastic deformation, the improvement wherein:

said ring has an inwardly directed surface that faces in the direction of a combustion chamber and that is guided, relative to said centering means, only via a cylindrical guide region of one of said ring and said raised collar; and a free space is provided between said ring and said centering means and increases continuously proceeding from said cylindrical guide region so that after plastic deformation said ring rests flat upon said cylinder liner beyond the region of a radius that defines a transition between said cylinder liner and said raised collar thereof.

2. A cylinder head sealing arrangement according to claim 1, wherein said cylindrical guide region is disposed on said inwardly directed surface of said ring; wherein said free space between said ring and said centering means has a conical configuration; and wherein in the zone of said plastic deformation of said ring, said cylinder liner is provided with an annular rib and said cylinder head is provided with an annular groove that is disposed across from said rib; with said ring being approximately centrally disposed between said rib and said groove; with said first end face of said ring facing said rib and having a surface area with a value of Al; with said second end face of said ring facing said groove and having a surface area, less an annular surface area of said groove, with a value A2; with the ratio of Al to A2 being $A1/A2 = 3/2$; with said rib having an annular surface area with a value A3; and with the ratio of A3 to A2 being $A3/A2 = 1/2$.

3. A cylinder head sealing arrangement according to claim 1, wherein said cylindrical guide region is disposed on said inwardly directed surface of said ring; wherein said free space between said ring and said centering means has a conical configuration; and wherein in the zone of said plastic deformation of said ring, said cylinder liner is provided with a first annular groove and said cylinder head is provided with a second annular groove that is disposed across from said first annular groove and has the same width; with said ring being approximately centrally disposed between said first and second annular grooves; with said first end face of said ring facing said first annular groove and having surface area portions reduced by an annular surface area of said first annular groove; with said second end face of said ring facing said second annular groove and having surface area portions reduced by an annular surface area of said second annular groove; and with the ratio of both the surface area of said second end face to the sum of said surface area portions thereof, as well as the surface area of said first end face to the sum of said surface area portions thereof, being in the range of from 1:1 to 3:2.

4. A cylinder head sealing arrangement according to claim 1, wherein said cylindrical guide region is disposed on said inwardly directed surface of said ring; wherein said free space between said ring and said centering means has a conical configuration: and wherein in the zone of said plastic deformation of said ring, said cylinder liner is provided with an annular groove and said cylinder head is planar adjacent said second end face of said ring; with the ratio of the surface area of said second end face of said ring to the surface area of said first end face thereof less an annular surface area of said groove, being 3:2.

5. A cylinder head sealing arrangement according to claim 1, wherein said cylindrical guide region is disposed on said raised collar of said cylinder liner; wherein at a transition from said guide region to said first end face of said ring, said cylinder liner is provided with a relief area: and wherein at a transition from said guide region to said cylinder head, said raised collar is provided with a chamfer.

6. A cylinder head sealing arrangement according to claim 5, wherein said chamfer of said raised collar has a conical configuration.

* * * * *